United States Patent
Loncaric

[15] 3,698,746
[45] Oct. 17, 1972

[54] CRACK ARRESTER
[72] Inventor: Rado G. Loncaric, Dallas, Tex.
[73] Assignee: Atlantic Richfield Company, New York, N.Y.
[22] Filed: Jan. 18, 1971
[21] Appl. No.: 107,296

[52] U.S. Cl. ..................285/286, 29/417, 29/477, 285/422, 138/155, 138/178
[51] Int. Cl. .................................................F16l 13/02
[58] Field of Search......138/177, 170, 171, 155, 178; 29/417, 477, DIG. 17; 285/286, 422

[56] References Cited

UNITED STATES PATENTS

| | | | |
|---|---|---|---|
| 3,096,105 | 7/1963 | Risley | 285/286 |
| 351,987 | 11/1886 | Lewis | 138/177 |
| 2,346,392 | 4/1944 | Protin | 138/177 |
| 1,908,889 | 5/1933 | Browne | 138/177 X |
| 3,131,727 | 5/1964 | Powell | 138/177 X |
| 2,067,801 | 1/1937 | Taylor | 138/171 X |
| 2,883,246 | 4/1959 | Hatch | 138/155 X |
| 1,483,450 | 2/1924 | Kenney | 29/477 |
| 1,483,451 | 2/1924 | Kenney | 29/477 |

*Primary Examiner*—Herbert F. Ross
*Attorney*—Blucher S. Tharp and Roderick W. MacDonald

[57] ABSTRACT

A crack arrester and a pipeline containing at least one of the same wherein the crack arrester is a cylindrical part for use in-line in a pipeline, the cylindrical part having a longitudinal impact strength substantially greater than its transverse impact strength.

7 Claims, 7 Drawing Figures

PATENTED OCT 17 1972　　3,698,746
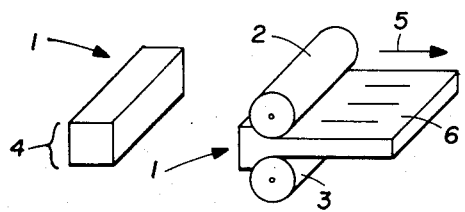
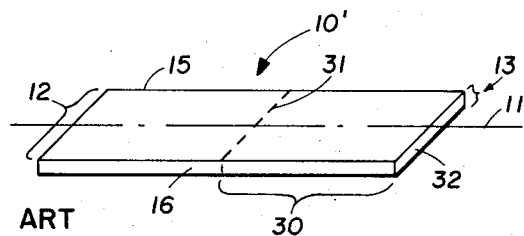
PRIOR ART
FIG. 1
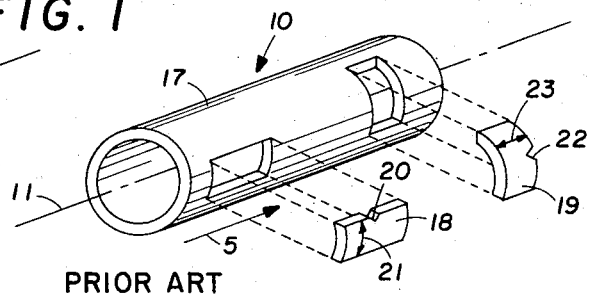
PRIOR ART　　　　PRIOR ART
FIG. 2　　　　　　FIG. 3
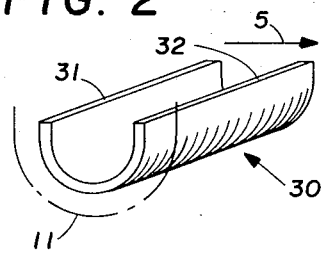
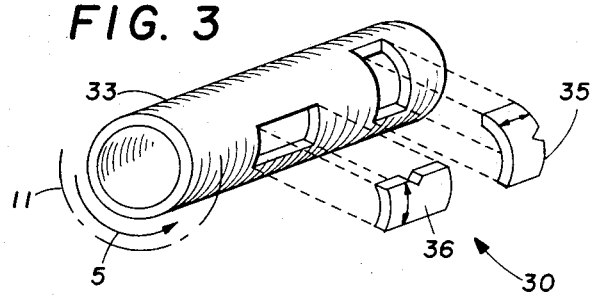
FIG. 4　　　　　FIG. 5
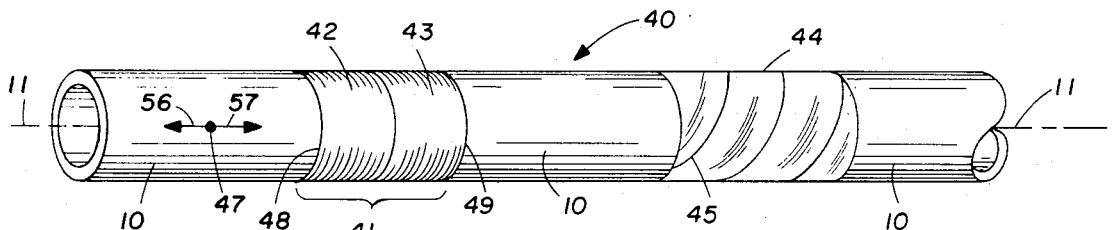
FIG. 6
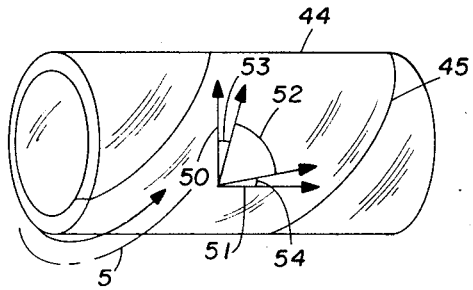
FIG. 7
INVENTOR:
RADO G. LONCARIC
Roderick W. MacDonald
ATTORNEYS

CRACK ARRESTER

BACKGROUND OF THE INVENTION

Heretofore in the forming of right cylindrical pipe sections, which sections are later joined in an end-to-end fashion in open communication with one another to provide a pipeline, each pipe section has been formed from a metal plate which is substantially longer than it is thick or wide. The longitudinal or long axis of the plate is formed by rolling or otherwise elongating a shorter block of metal until the desired length parallel to the longitudinal axis is reached. The elongated plate is then folded about is longitudinal axis to form the cylindrical pipe section and the abutting sides of the folded plate are joined to one another such as by welding. Thus, the longitudinal axis of the plate is also the longitudinal axis of the pipe section and is substantially parallel to the final longitudinal axis of the pipeline.

In a pipeline which is in use, a fracture or crack at one spot in the pipeline can be caused by various sources, for example by corrosion, impact from an external force such as a trenching machine accidentally striking the pipeline, earthquakes, and the like. When a crack does occur in a pipeline, if the rate of release of pressure in the fluid (liquid and/or gas) carried in the pipeline is slower than the speed at which the crack in the pipeline occurs, the crack may become self-propagating since it will always be occurring at the tip of a crack which is a point under stress of pressure. When a crack occurs in a pipeline under pressure, the speed at which the pressure is released depends upon the rate at which the decompression wave can travel and this rate depends in large part on the characteristics of the fluid carried in the pipeline. The rates of decompression are comparatively slow in gas pipelines as opposed to liquid pipelines. For example, the rates of decompression in gas pipelines are about 1,400 feet per second whereas a crack, once started in the pipeline, can travel at speeds as high as 2,500 feet per second. This is an example of what is called brittle crack propagation. There is also what is known as shear crack propagation in which case the rate of decompression and the rate of crack propagation are both substantially lower than for brittle crack propagation. Thus, in a gas pipeline the decompression wave can travel substantially behind the point at which fracturing is occurring so that the decompression wave has difficulty catching up with the incipient fracturing. The crack will then become self-propagating and as such can travel along the length of the pipeline for miles. The same considerations are not true in pipelines carrying liquids such as crude oil because the decompression wave in a pipeline carrying crude oil can travel at speeds up to 4,500 feet per second which is substantially faster than the 2,500 feet per second of the fracture. Thus, the decompression wave in a crude oil pipeline will overtake the fracture in short order at which time the interior of the pipeline is decompressed and the crack stopped. Accordingly, a self-propagating fracture which can travel for miles along the length of a pipeline before stopping is not the risk in a crude oil pipeline that it is in a compressed gas pipeline such as a natural gas pipeline.

In a gas pipeline it is quite important to have some means present for stopping a self-propagating fracture.

SUMMARY OF THE INVENTION

According to this invention there is provided a pipeline crack (fracture) arrester which comprises at least one cylindrical part, each cylindrical part being of a size and configuration adapted for in-line use in a pipe line and having a longitudinal impact strength substantially greater than its transverse impact strength. This invention is operable in stopping both brittle crack propagation and shear crack propagation.

In the situation described hereinabove wherein a pipeline is composed of a plurality of sections of pipe wherein the longitudinal axis of each section of pipe is parallel to the longitudinal axis of the elongated plate from which the section was made, each section of pipe is uniformly weak in a transverse direction so that a self-propagating fracture will meet no increase in resistance and therefore will not be slowed down as it travels from pipe section to pipe section along the length of the pipeline.

In the situation described hereinabove wherein a metal block is elongated more in one direction than in another to provide a plate which is formed parallel to its longitudinal direction into a pipe section, the transverse impact strength of that pipe section and all other pipe sections similarly formed, will be substantially greater than the longitudinal impact strength of that pipe section. The terms "transverse impact strength" and "longitudinal impact strength" will be defined in more detail hereinafter, but suffice it to say that in the normal pipeline in use today each pipe section comprising that pipeline has a substantially stronger transverse impact strength than longitudinal impact strength and it has been found that this condition aids rather than hinders a self-propagating fracture.

Accordingly, by the use of a crack arrester according to this invention a self-propagating fracture can be slowed to the point that the decompression wave catches up with it thereby allowing decompression of the pipeline at the point where fracturing is being initiated and stopping the propagation of the crack altogether.

This invention also relates to a pipeline formed from a plurality of sections of pipe, each section of pipe having a longitudinal impact strength substantially weaker than its transverse impact strength, wherein at least one of the crack arresters according to this invention are fixed in open communication in the pipeline at at least one intermediate point between the ends of the pipeline.

The crack arrester of this invention is useful in all types of pipelines including those carrying liquids, particularly where the liquids transmit a decompression wave at rates below the rate of travel of a fracture in the pipeline. This invention is particularly useful in all pipelines which carry a compressed gas, particularly natural gas, since this type of fluid can transmit the decompression wave at rates substantially below the rate of travel of the crack and are therefore much more susceptible to self-propagating fracturing.

Accordingly, it is an object of this invention to provide a new and improved crack arrester for pipelines. It is another object of this invention to provide a new and improved pipeline which will stop a self-propagating fracture once initiated. It is another object to provide a new and improved apparatus which will stop the propagation of a crack in a pipeline, particularly in a pipeline carrying a gas under pressure. It is another object to provide a new and improved pipeline, particularly a natural gas pipeline, capable of extinguishing fractures which would otherwise be self-propagating along a substantial portion of the length of that pipeline.

Other aspects, objects, and advantages of this invention will be apparent to those skilled in the art from this disclosure and the appended claims.

DETAILED DESCRIPTION OF THE INVENTION

FIGS. 1 through 3 show a conventional prior art process for forming a pipe section.

FIGS. 4 and 5 show the formation of a crack arrester according to this invention.

FIG. 6 shows a pipeline employing a variety of crack arresters within this invention.

FIG. 7 shows another form of crack arrester within the scope of this invention.

More specifically, FIG. 1 shows a block 1 of metal. The block can be composed of any malleable metal or alloy of two or more metals (with or without non-metallic additives such as carbon and boron) which can be hot rolled and/or cold rolled into an elongated plate. Generally, any metal useful in making metal pipe can be employed in making the crack arresters of this invention so that the crack arrester of this invention can be formed of the materials as described for block 1.

Block 1 is passed one or more times between one or more pairs of spaced apart rollers, e.g., rollers 2 and 3. The space between rollers 2 and 3 is less than the height 4 of block 1 so that the block is elongated substantially in its direction of rolling 5 as shown by portion 6 of block 1 which is issuing from between rolls 2 and 3.

The rolling procedure can be carried out while the block is either hot or cold and can be repeated a number of times until block 1 has taken the elongated plate configuration shown by plate 10'. In plate 10' the longitudinal axis 11 is parallel to the rolling direction 5 and is substantially longer than the width 12 or thickness 13. It should be understood that there can be some amount of rolling of plate 10' normal to or at other angles to longitudinal axis 11 to achieve a desired width 12, while retaining a primary rolling direction 5 which is parallel to the longitudinal axis 11 of the resulting plate 10'.

As shown in FIG. 2, plate 10' is formed into a U configuration by folding about (parallel to) longitudinal axis 11 until sides 15 and 16 which are parallel to axis 11 and rolling direction 5, are pointed upwardly.

As shown in FIG. 3 U'd plate 10' of FIG. 2 is formed into a cylindrical configuration 10 by bringing sides 15 and 16 into abutment and joining the sides along the length thereof such as by welding to form a substantially straight seam 17. When sides 15 and 16 are joined in this manner a substantially straight seamed pipe section is formed.

It should be noted that the resulting pipe section 10 was formed from roller plate 10' by bending the plate about its longitudinal axis 11 so that the longitudinal axis 11 of pipe section 10 is the same and is parallel to the primary rolling direction 5. Thus, when the pipe section of FIG. 3 is joined in an end-to-end pipeline fashion all sections in the pipeline will have their longitudinal axes 11 parallel to the longitudinal axis of the pipeline and also parallel to the primary rolling direction of the plate from which each pipe section was formed.

A procedure for determining strength characteristics of a particular metal is known as the Charpy V-Notch Impact Test which is fully and completely disclosed as ASTM Test E 23–66. In this test a specimen is cut from the metal to be tested, a notch according to certain specifications cut in the specimen, and the specimen tested according to precise procedures to determine how many foot pounds of energy is absorbed by the specimen upon being impacted with a standard force.

In making tests on the prior art pipe section shown in FIG. 3, specimens would be taken from the pipe section parallel to the longitudinal axis 11 as shown by specimen 18 and transverse to longitudinal axis 11 as shown by specimen 19. Longitudinal specimen 18 would be notched in a direction normal to the direction of longitudinal axis 11 as shown by notch 20 so that the specimen when tested would break in a transverse direction as shown by arrow 21. Thus a longitudinal test specimen measures transverse impact strength. Transverse specimen 19 would be notched parallel to longitudinal axis 11 as shown by notch 22 and therefore would fracture parallel to longitudinal axis 11 as shown by arrow 23. Therefore a transverse test specimen measures longitudinal impact strength.

For reasons not completely understood, in a pipe section such as that shown in FIG. 3 which has been formed so that its longitudinal axis 11 is parallel to the primary rolling direction 5, the transverse impact strength as measured by longitudinal specimen 18 is substantially greater than the longitudinal impact strength as measured by transverse specimen 19. Thus, a crack propagating along the length of pipe section 10 substantially parallel to the longitudinal axis 11 would be working against the weaker longitudinal impact strength as measured by transverse specimen 19 and would encounter no great or increasing resistance as it moved along the length of pipe section 10 and other similar pipe sections down the length of the pipeline. Thus, pipe section 10 and all similar pipe sections are very susceptible to a self-propagating longitudinal fracture situation.

A crack arrester according to this invention can be formed from a portion of plate 10' of FIG. 1 by taking a portion 30 of plate 10' and forming it into a U configuration transverse to both its longitudinal axis 11 and primary direction of rolling 5. For example, section 30 of plate 10' in FIG. 1 is taken by cutting along dotted line 31 (line 31 identifies the left end of portion 30, the opposing right end being end 32). Section 30 is then formed into a U configuration as shown in FIG. 4 so that ends 31 and 32 extend upwardly. This is completely contrary to the prior art step shown in FIG. 2 wherein plate 10' is bent from side to side, side 15 to side 16, since portion 30 is bent from end to end, end 31 to end 32.

FIG. 5 shows U'd portion 30 formed into a cylindrical configuration by bringing ends 31 and 32 into abutment and fixing them together such as be welding with a substantially straight seam 33.

Portion 30 has been formed into a cylindrical configuration transverse to both the longitudinal axis 11 of plate 10' and its primary direction of rolling 5. In this situation the transverse impact strength of portion 30 measured by longitudinal specimen 36 will be substantially less than the longitudinal impact strength measured by transverse specimen 35.

FIG. 6 shows a pipeline 40 formed from a plurality of conventionally prepared pipe sections 10. Normally, pipe sections 10 would be placed in an end-to-end pipeline fashion in open communication with one another and welded or otherwise coupled together as such. However, according to this invention at least two of the pipe sections 10 in the pipeline are separated from one another by a crack arrester 41.

The crack arrester is of a size substantially the same both in internal and external diameter so that it is adapted for use in-line in the pipeline just as pipe sections 10 are adapted for in-line use in the pipeline.

Arrester 41 can be composed of one or more cylindrical parts. As shown in FIG. 6 arrester 41 is composed of two cylindrical parts 42 and 43 joined in an end-to-end pipeline fashion such as by welding and the like. Thus, a single arrester 41 can be composed of one cylindrical part or two or more cylindrical parts joined together in pipeline fashion. In FIG. 6 cylindrical part 42 can be one portion 30 of FIG. 5 while part 43 is yet another portion 30 of FIG. 5.

Each cylindrical part in an arrester according to this invention has a longitudinal axis parallel to the longitudinal axis 11 of pipe sections 10 but the length of each part parallel to its longitudinal axis may be substantially shorter than the length of each pipe section 10. The length of a cylindrical part in an arrester parallel to its longitudinal axis may even be less than its inside diameter, but this length is still considered to be parallel to its longitudinal axis since it is parallel to the longitudinal axis 11 of pipe sections 10 and to the longitudinal axis of the pipeline. Of course, each arrester can be of any desired length, even longer than a pipe section 10, if desired. It is preferred that when two or more cylindrical sections 42 and 43 are employed to form a single arrester, the straight seam welds such as seam 33 in FIG. 5 not be aligned with one another. It is preferred that the seams in adjacent cylindrical parts of an arrester are rotationally spaced from one another.

More than one arrester 41 can be employed along the length of the pipeline as desired and as depends upon the particular materials employed for the pipe sections, the arresters, the fluid carried by the pipeline, and the likelihood of a crack occurring. Therefore, the number of individual arresters employed along a given pipeline can be one somewhere intermediate the ends of the pipeline, one between each pair of pipe sections as shown in FIG. 6, or any number in-between.

The crack arrester of this invention need not have a transverse impact strength substantially less than the longitudinal impact strength. It can be sufficient if the crack arrester has an impact strength which is at angle between transverse and longitudinal and which is substantially less than its longitudinal impact strength. This is achieved by employing a cylindrical part 44 which is spirally wrapped about its longitudinal axis and primary rolling direction thereby providing a cylindrical part which is spirally seamed (45) rather than straight seamed (parts 42 and 43 and portions 30 of FIG. 5).

Straight seamed and spirally seamed cylindrical parts can be employed alternatively, joined, in sequence, or in any other desired combination along the length of the pipeline. For example, besides the possibility shown in FIG. 6, a spirally seamed crack arrester could be emplaced between cylindrical parts 42 and 43 or on either or both sides of those parts, and the like.

When a fracture is initiated for some reason, for example, in the left most pipe section 10 of FIG. 6 at point 47, the crack will propagate parallel to the longitudinal axis 11 since pipe section 10 has a stronger transverse impact strength than longitudinal impact strength and the crack will travel toward both ends of pipe section 10 as represented by arrows 56 and 57. The end of the crack traveling parallel to arrow 57 will run into arrester 41 which has a stronger longitudinal impact strength because the transverse impact strength of cylindrical part 42 is the same as the longitudinal impact strength of pipe section 10, cylindrical part 42 being formed as portion 30 of FIG. 5. The fracture propagation will slow when it encounters tougher cylindrical part 42 and by the time it has traveled to some point between end 48 and end 49 of arrester 41 it will have been slowed in its propagation sufficiently for the decompression wave to catch up with it and decompress the pipeline in the area where the fracture is propagating thus stopping the propagation of the crack. The crack propagating in the direction of arrow 56 will travel in that direction until stopped in like manner by another crack arrester, but if there is not another crack arrester in the direction of arrow 56 the crack could propagate for miles along the length of the pipeline before being stopped by chance.

Arrester 44 of FIG. 6 is shown more in detail in FIG. 7. Arrester 44 is formed from a flat plate such as plate 10' of FIG. 1 but instead of being folded parallel to longitudinal axis 11 in a side 15 to side 16 fashion to provide a straight seam 17 which is substantially parallel to longitudinal axis 11, plate 10' is folded spirally about longitudinal axis 11 so that edges 15 and 16 meet one another in a spiral to provide a spiral seam 45. In this manner longitudinal axis 11 of plate 10' in FIG. 1 and the primary rolling direction 5 follow the spiral of seam 45. Thus, the greater impact strength (which is the transverse strength in the pipe section of FIG. 3 and the longitudinal strength in portion 30 of FIG. 5) is at an angle between transverse direction 50 and longitudinal direction 51. The angle 52 in which the greater impact strength will occur will vary widely between transverse direction 50 and longitudinal direction 51 but will generally be at least about 10° from transverse as represented by angle 53 and at least about 10° from longitudinal as represented by angle 54.

The arresters of this invention can be formed from any material which is now being formed into metal pipe. Such materials include steel, copper, stainless steel, and the like. A particularly useful material is steel which contains primarily (at least about 50 weight percent based on the total weight of the steel) ferrite with minor amounts (less than 50 weight percent based on the total weight of the steel) of austenite, martensite, and the like.

Although this invention has been disclosed in relation to the use of seamed pipe sections, the invention is equally applicable to seamless pipe sections or any other type of pipe section so long as the longitudinal impact strength of the pipe section is substantially less than its transverse impact strength, in which case the arresters according to this invention which have a longitudinal impact strength substantially greater than their transverse impact strength can be used to good avail in stopping a self-propagating fracture. In like manner the arresters of this invention, besides being seamed, can be seamless so long as they meet the above requirements concerning relative impact strengths.

EXAMPLE

A carbon steel consisting essentially of ferrite with a minor amount of retained austenite therein and having a tensile strength of about 75,000 psi is initially in a 1 foot square block and is hot rolled as shown in FIG. 1 with both transverse and longitudinal rolling to form plate 10' which has a thickness 13 of about one-half inch, a width 12 of about 5 feet, and a length parallel to the primary direction of rolling 5 and parallel to longitudinal axis 11 of about 60 feet.

The plate when formed into a pipe section as shown in FIG. 3 has a transverse impact strength as measured by longitudinal specimen 18 of 120 to 150 foot-pounds and a longitudinal impact strength as measured by transverse specimen 19 of 50 to 80 foot-pounds.

Portion 30 taken from plate 10' of FIG. 1 and formed into a cylindrical part as shown in FIG. 5, portion 30 being 5 feet in width 32 and 6 feet long, forms a cylindrical part 30 of a size adapted to be welded to either end of pipe section 10 of FIG. 3 in open communication therewith to form a portion of the pipeline. However, cylindrical part 30 has a transverse impact strength measured by longitudinal specimen 35 of 50 to 80 foot-pounds and a longitudinal impact strength as measured by transverse specimen 36 of 120 to 150 foot-pounds.

Thus, a fracture propagating in pipe section 10 parallel to its longitudinal axis 11 is working against a longitudinal impact strength of 50 to 80 foot-pounds but when the crack reaches cylindrical part 42 of crack arrester 41 which is composed of portion 30 of FIG. 5, the crack immediately encounters a longitudinal impact strength of 120 to 150 foot-pounds which slows the rate of crack propagation to the point where the following decompression wave catches up to the tip of the crack at which point fracturing in unfractured metal is just beginning and decompresses the interior of the pipeline at this point thereby arresting the crack propagation.

Reasonable variations and modifications are possible within the scope of this disclosure without departing from the spirit and scope of this invention.

The embodiments of the invention in which an exclusive property or privilege is claimed are defined as follows:

1. In a pipeline formed from a plurality of sections of pipe each section having a longitudinal impact strength substantially less than its transverse impact strength, the improvement comprising at least one crack arrester fixed in open communication in said pipeline at at least one intermediate point between the ends of said pipeline, each crack arrester comprising at least one cylindrical part, each cylindrical part having an impact strength at an angle between transverse and longitudinal which is substantially greater than the longitudinal impact strength of each section of pipe, said angle between transverse and longitudinal is in the range of from about 10° from transverse to about 10° from longitudinal.

2. A pipeline according to claim 1 wherein a plurality of said crack arresters are fixed in-line in said pipeline at spaced apart points along the length thereof.

3. A pipeline according to claim 1 wherein each crack arrester comprises a spirally seamed cylindrical part whose impact strength at an angle between transverse and longitudinal is substantially greater than its transverse impact strength.

4. A pipeline according to claim 1 wherein said impact strength at an angle between transverse and longitudinal is at least about 25 percent greater than said transverse impact strength.

5. A pipeline according to claim 1 wherein each cylindrical part is formed from at least one rolled plate which has been formed into a cylindrical configuration, and the primary direction of rolling of said plate is at an angle between transverse and longitudinal in the cylindrical configuration.

6. A pipeline according to claim 1 wherein said plate is steel plate.

7. A pipeline according to claim 6 wherein said steel is primarily ferritic with minor amounts of austenite and/or martensite.

* * * * *

UNITED STATES PATENT OFFICE
CERTIFICATE OF CORRECTION

Patent No. 3,698,746        Dated October 17, 1972

Inventor(s) Rado G. Loncaric

It is certified that error appears in the above-identified patent and that said Letters Patent are hereby corrected as shown below:

Column 8, line 42, "claim 1" should read ---claim 5---.

Signed and sealed this 13th day of March 1973.

(SEAL)
Attest:

EDWARD M. FLETCHER, JR.
Attesting Officer

ROBERT GOTTSCHALK
Commissioner of Patents